US008139766B2

(12) United States Patent
Koseki et al.

(10) Patent No.: US 8,139,766 B2
(45) Date of Patent: Mar. 20, 2012

(54) PSEUDO PUBLIC KEY ENCRYPTION

(75) Inventors: Akira Koseki, Kanagawa-ken (JP);
Takeshi Imamura, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 12/558,868

(22) Filed: Sep. 14, 2009

(65) Prior Publication Data

US 2009/0323935 A1     Dec. 31, 2009

Related U.S. Application Data

(63) Continuation of application No. 11/338,063, filed on Jan. 23, 2006, now abandoned.

(30) Foreign Application Priority Data

Dec. 20, 2004    (JP) .................................. 2004-367676

(51) Int. Cl.
    *G06F 21/00*     (2006.01)
(52) U.S. Cl. .......................................... 380/30; 713/189
(58) Field of Classification Search ......................... None
See application file for complete search history.

(56) References Cited

FOREIGN PATENT DOCUMENTS

| JP | 04-247737 | 9/1992 |
|---|---|---|
| JP | 2004-070712 | 3/2004 |

OTHER PUBLICATIONS

Yvo Desmedt et al., "Public-Key Systems based on the difficulty of tampering", Proceedings of Crypto '86, LNCS, Springer-Verlag, 1986 pp. 111-117.

*Primary Examiner* — Benjamin Lanier
(74) *Attorney, Agent, or Firm* — Shimokaji & Assoc., P.C.

(57) ABSTRACT

According to the present invention, a secret key cryptosystem and tamper-proof hardware are used to realize a pseudo-public key cryptosystem at a low cost. A trap-door one-way function is substantially realized with the use of tamper-proof hardware. Each user performs communication using equipment provided with hardware having the same capabilities described below. Such hardware retains association between an ID and a key. In response to a request from a user, the hardware issues and stores an ID, and it can perform decryption and generation of a MAC (message authentication code) with a key associated with the ID. A user publishes his ID. When performing encryption, a message sender encrypts a message using the published ID. A third person can perform decryption with the ID only by analyzing the mechanism in the hardware. However, the hardware has a capability of destroying itself when such an act is attempted.

2 Claims, 5 Drawing Sheets

PSEUDO PUBLIC KEY ENCRYPTION

RELATED APPLICATIONS

This application claims priority to Japan Patent Application No. 2004-367676 filed Dec. 20, 2004 and is a continuation of U.S. patent application Ser. No. 11/338,063 filed Jan. 23, 2006

FIELD OF THE INVENTION

The present invention relates to a method and system for a public key encryption, and in particular to a method and system for realizing a pseudo public key cryptosystem at a low cost.

BACKGROUND ART

Public key encryption methods, which are especially important among today's encryption techniques, are widely used for encryption, signature and authentication. An algorithm for realizing a public key cryptosystem generally requires a very high cost of calculation. One of practical methods to realize a public key cryptosystem is an RSA cryptography. The RSA cryptography requires an operation of raising a plaintext or a ciphertext to the power of the number (an encryption exponent or a decryption exponent) obtained from a value of the Eulerian function of n, which is a product of two large prime numbers and then determining the residue of n, and the cost of this operation is very high. In order to enhance the security of a key, the bit number of n is required to be large. However, the cost of calculation required for RSA cryptography with a large bit number is very high. Though measures such as performing such an operation with dedicated hardware may be taken to seek a high speed, this may impose a development and manufacture cost burden or affect product flexibility. Because of such a situation, the cost of a cryptosystem using a public key is high, and it is difficult to incorporate it in an apparatus which is inexpensively mass-produced.

Also known is elliptic-curve cryptography with a smaller bit number and an equivalent strength in comparison with an RSA cryptography. However, though the cost of operations required for encryption (scalar multiplication of a point on an elliptic curve defined on a finite body, and the like) is lower in comparison with that of modulo exponentiation, the cryptography similarly requires expensive operations, and therefore, it is still difficult to incorporate it in an apparatus which is inexpensively mass-produced. Furthermore, there is also proposed a method for realizing a public key cryptosystem with the use of a secret key cryptosystem and tamper-free hardware. In this method, a receiver encrypts his own secret key with a secret key of a third-party body and publishes it. A sender decrypts it with the secret key of a third-party body, encrypts a message with the obtained secret key of the receiver and sends it. The receiver decrypts it with his own secret key. Because encryption with the secret key of the third-party body, decryption with the secret key of the third-party body and encryption with the secret key of the receiver are performed in temper-proof hardware, security is ensured. In this method, however, the sender and the receiver have to use different hardware, and both of their secret keys are required to use the same hardware. This method is similar to an approach such as an ID-based cryptosystem, in which a public key is distributed not via a certification body, in that an ID is published. In this method, a key generation body generates a user's private key from an unique ID of the user, and anyone can generate the user's public key from the user's ID. This method is convenient with regard to distribution of a public key. However, the nature of the trap-door one-way function in the RSA cryptography and the like is utilized for encryption-decryption of a message, and the cost required for the processing is as high as that of common public key cryptosystems.

Patent Document 1 Published Unexamined Patent Application No. 2004-70712

SUMMARY OF THE INVENTION

In a first aspect, the present invention provides a method for performing key encryption with the use of an apparatus comprising an encryption-authentication section wherein the encryption-authentication section of the apparatus comprises: an ID issuance-registration section for issuing the ID in response to a request by a user, and storing the ID in a storage section; a key generation section for generating a key corresponding to the ID and outputting the key; a first key acquisition section for, in response to a request by a user for decryption or generation of a message authentication code, comparing an inputted ID and the ID stored in an ID storage section, and, if the IDs are corresponding to each other, handing over the ID to the key generation section to output a key generated by the key generation section; a second key acquisition section for, in response to a request by a user for encryption or verification of a message with a message authentication code attached thereto, handing over an inputted ID to the key generation section to output the key generated by the key generation section; a message authentication code generation section for handing over the inputted ID to the first key acquisition section, and, with the use of a key outputted from the first key acquisition section, calculating and outputting a message authentication code of an inputted message; a message authentication code verification section for handing over the inputted ID to the second key acquisition section, calculating the message authentication code of the inputted message with the use of a key outputted from the second key acquisition section, comparing an obtained message authentication code and an inputted message authentication; an encryption section for handing over an inputted ID to the second key acquisition section, encrypting inputted text with the use of the key outputted from the second key acquisition section, and returning the result to the user; and a decryption section for handing over the inputted ID to the first acquisition section and, with the use of the key outputted from the first key acquisition section, decrypting and outputting inputted encrypted text.

BRIEF DESCRIPTION OF THE DRAWINGS

These, and further, aspects, advantages, and features of the invention will be more apparent from the following detailed description of a preferred embodiment and the appended drawings, wherein.

DESCRIPTION OF SYMBOLS

Figure 1:
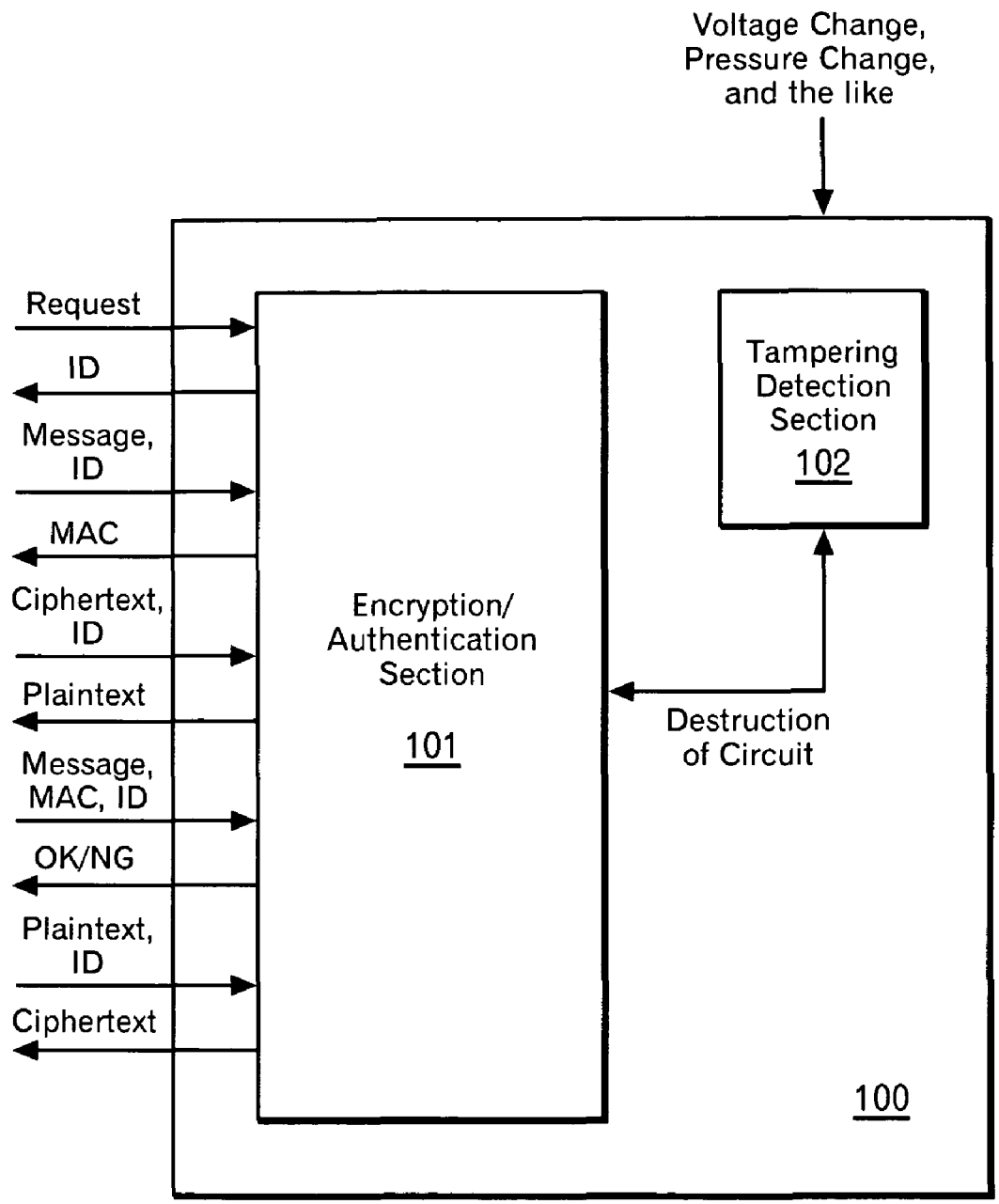
FIG. 1 is a block diagram of hardware of the present invention.

100 ... System
101 ... Encryption-authentication section
102 ... Tampering detection section
201 ... ID issuance-registration section
206 ... ID storage section
210 ... Key generation section
209 ... Seed storage section
207 ... First key acquisition section
208 ... Second key acquisition section
202 ... Generation section
204 ... Verification section
205 ... Encryption section
203 ... Decryption section
502 ... ID storage body

DETAILED DESCRIPTION OF THE INVENTION

The present invention provides methods, apparatus and systems for realizing a pseudo public key cryptosystem at a low cost. The invention also provides methods, apparatus and systems capable of more inexpensively realizing encrypted information communication and code-signed communication with the use of a public key.

The present invention provides methods, apparatus and systems for enabling information processing and communication to be performed with high security maintained, on a terminal such as a mobile terminal on which signature is frequently performed and for which instantaneous processing is required. The present invention further provides methods, apparatus and systems for realizing a function which requires an expensive operation using pseudo operations.

In an example embodiment of the present invention, a secret key cryptosystem and tamper-proof hardware are used to realize a pseudo public key cryptosystem at a low cost. A trap-door one-way function, which is considered essential for constitution of a public key cryptosystem generally, requires an "expensive" operation. Such a function is substantially realized with the use of tamper-proof hardware. Each user performs communication using equipment provided with hardware having the same capabilities described below. Such hardware retains association between an ID and a key. In response to a request from a user, the hardware issues and stores an ID, and it can perform decryption and generation of a message authentication code (hereinafter referred to as a MAC) with a key associated with the ID. Though this hardware can perform encryption and verification of a MAC with any given ID, it cannot perform decryption and generation of a MAC. A user publishes his ID. When performing encryption, a message sender encrypts a message using the published ID of a message receiver and using hardware having the same capabilities as the receiver's hardware. A person can perform decryption with the ID only by analyzing the mechanism in the hardware. However, the hardware has a capability of destroying itself when such an act is attempted.

When a symmetric function is used, it is basically difficult to derive K2 from K1, when plaintext is denoted by P, a ciphertext by C, a public key by K1, and a private key by K2.

$$C = F(P) = H(P, K1)$$

$$P = F^{-1}(C) = H(C, K2)$$

As for the function F satisfying the above, if it is virtually impossible for one who does not know K2 to calculate $F^{-1}$, then a public key cryptosystem can be constituted. In the present invention, a function F of a secret key K by inexpensive calculation is prepared, and the capability of F is hidden in tamper-proof hardware. Meanwhile, K=G(ID), a one-to-one function hidden in hardware, is prepared so that the following are satisfied, where ID is an identifier of the secret key.

$$C = F(P) = H(P, G(ID))$$

$$P = F^{-1}(C) = H(C, G(ID))$$

In this case, the ID is published as a pseudo public key so that anyone can calculate G(ID) when performing encryption or verification of a MAC. On the other hand, when decryption or generation of a MAC is performed, only a valid owner of the ID can calculate G(ID). Thereby, a trap-door one-way function F realized by hardware is constructed, and a pseudo public key cryptosystem is realized.

As an advantageous apparatus of the present invention, there is used an apparatus including tamper-proof hardware which comprises an encryption-authentication section for performing issuance of an ID, encryption and authentication in response to a request by a user and a tampering detection section for detecting voltage change or pressure change to electrically destroy the encryption-authentication section.

Pseudo public key encryption is performed by means of this apparatus. The encryption-authentication section of the apparatus comprises: an ID issuance-registration section for issuing an ID in response to a request by a user and storing the ID in a storage section; a key generation section for generating a key corresponding to the ID using a one-to-one function and outputting the ID; a first key acquisition section for, in response to a request by a user for decryption or generation of a message authentication code, comparing an inputted ID and the ID stored in the ID storage section and, if the IDs are corresponding to each other, handing over the ID to the key generation section to output a key generated by the key generation section; a second key acquisition section for, in response to a request by a user for encryption or verification of a message with a message authentication code attached thereto, handing over an inputted ID to the key generation section to output a key generated by the key generation section; a message authentication code generation section for handing over an inputted ID to the first key acquisition section and, with the use of a key outputted from the first key acquisition section, calculating and outputting a message authentication code of an inputted message; a message authentication code verification section for handing over an inputted ID to the second key acquisition section, calculating a message authentication code of an inputted message with the use of a key outputted from the second key acquisition section, comparing the obtained message authentication code and an inputted message authentication code, and, if the message authentication codes are corresponding to each other, returning information indicating that the verification has succeeded to the user; an encryption section for handing over an inputted ID to the second key acquisition section, encrypting inputted plaintext with the use of a key outputted from the second key acquisition section and returning the result to a user; and a decryption section for handing over an inputted ID to the first acquisition section and, with the use of a key outputted from the first key acquisition section, decrypting and outputting inputted encrypted text.

An example of a method for performing pseudo public key encryption with the use of this apparatus includes the steps described below. The method includes, in sending a message between a sending user and a receiving user having the apparatus A and the apparatus B, respectively, the steps of: the apparatus A selecting and storing a sending user ID, and then returning the sending user ID to the sending user, for publication of the sending user ID; the apparatus B selecting and storing a receiving user ID, and then returning the receiving user ID to the receiving user, for publication of the receiving user ID; the apparatus A acquiring a key corresponding to the sending user ID, generating a message authentication code and returning the message authentication code to the sending user; in response to a request by the sending user for encryption, the apparatus A acquiring a key corresponding to the receiving user ID, encrypting the message and the message authentication code and returning the encrypted message and message authentication code to the sending user; in response to a request by the receiving user for decryption of the encryption, the apparatus B acquiring a key corresponding to the receiving user ID, decrypting the received message and returning the decrypted message to the receiving user; and in response to a request by the receiving user for verification of the message authentication code, the apparatus B acquiring a key corresponding to the sending ID, verifying the message authentication code and returning the result to the receiving user. The above summary of the present invention does not enumerate all the necessary characteristics of the present invention, and a sub-combination of these characteristics may be the invention.

Advantages of the invention include making it possible to realize encrypted information communication and codesigned communication with the use of a public key at a low cost. By realizing the present invention on a mobile terminal which has recently been used for more and more various purposes, especially on an inexpensive and mass-produced terminal on which signing is frequently performed and from which processing immediacy is required, it is possible to enable information processing and communication requiring high-level security management even on such a terminal.

FIG. 1 shows a block diagram of hardware of the present invention. A system 100 is the entire system with an encryption-authentication section 101 and a tampering detection section 102 included therein. The encryption-authentication section 101 performs services such as issuance of an ID, encryption and authentication in response to a request from a user. The tampering detection section 102 detects voltage change or pressure change caused when a user attempts analysis of an internal circuit of the system 100, and electrically destroys the encryption-authentication section 101.

Figure 2:
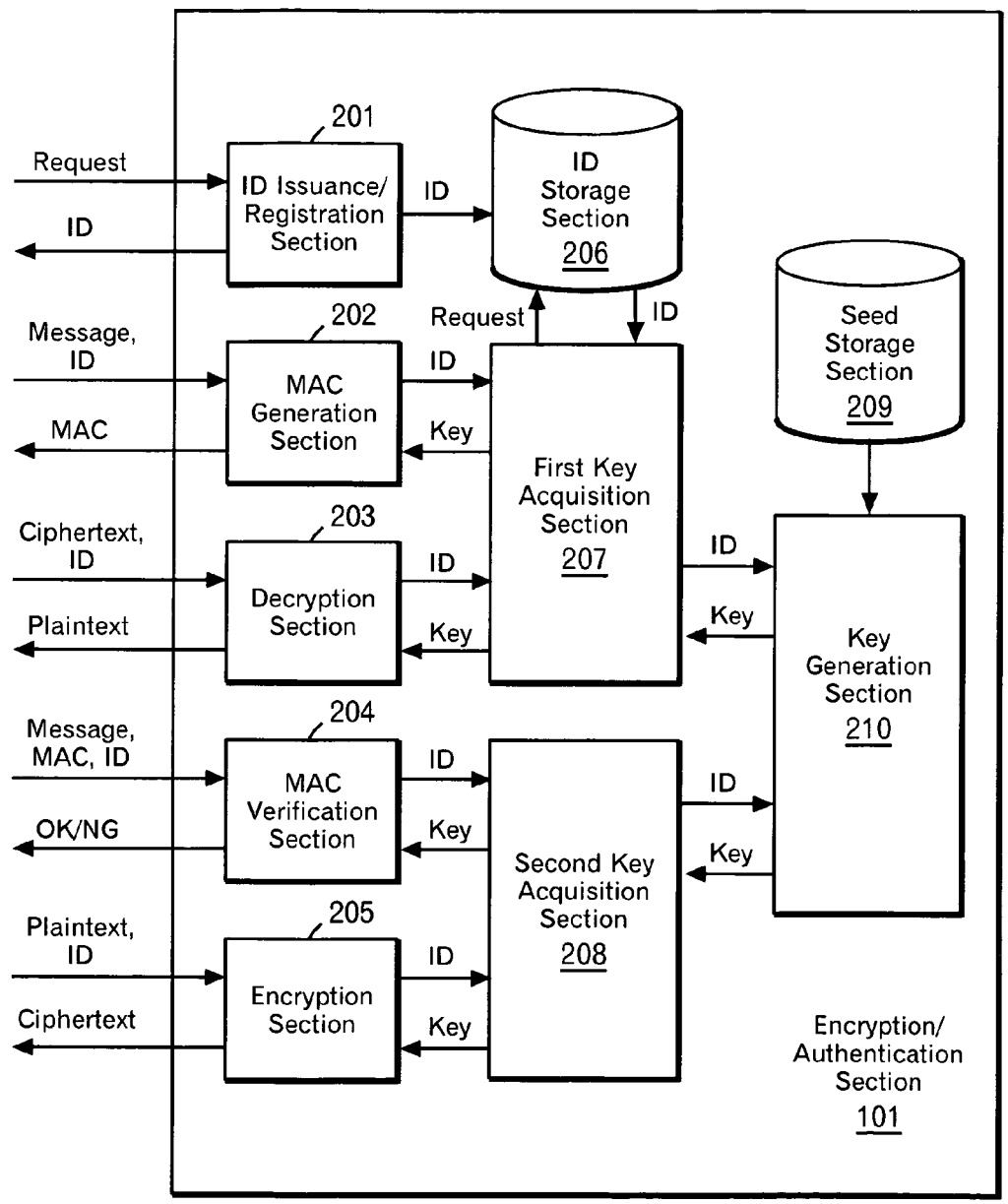
FIG. 2 is a diagram showing the details of an encryption-authentication section.

FIG. 2 is a diagram showing the details of the encryption-authentication section 101 in FIG. 1. An ID issuance-registration section 201 issues a unique ID in response to a request from a user, and stores it in an ID storage section 206. A key generation section 210 generates and outputs a key based on an inputted ID and a seed stored in a seed storage section 209. When a user attempts decryption or generation of a MAC, a first key acquisition section 207 compares an inputted ID with the ID stored in the ID storage section 206. If the IDs are the same, the first key acquisition section 207 hands over the ID to the key generation section 210, and outputs a key returned from the key generation section 210. If the IDs are not the same, an error is returned. When a user attempts encryption or verification of a MAC-attached message, a second key acquisition section 208 hands over an inputted ID to the key generation section 210, and outputs a key returned from the key generation section 210. With a message and an ID as input, a MAC generation section 202 hands over the ID to the first key acquisition section 207 and acquires a key. If an error is not returned from the key acquisition section, the MAC generation section 202 calculates and outputs a MAC of the message. If an error is returned from the key acquisition section, the MAC generation section 202 returns an error to the user. With the message, the MAC and the ID as input, a MAC verification section 204 hands over the ID to the second key acquisition section 208 and acquires a key. The MAC generation section 202 calculates and outputs a MAC of the message based on the key, and compares the obtained MAC with the inputted MAC. If the MACs are the same, information indicating that the verification has succeeded is returned to the user. Otherwise, information indicating that the verification has failed is returned to the user. With plaintext and the ID as input, an encryption section 205 hands over the ID to the second key acquisition section 208 and acquires a key. The encryption section 205 encrypts the plaintext based on the key, and returns the result to the user. With the ciphertext and the ID as input, a decryption section 203 hands over the ID to the first key acquisition section 207 and acquires a key. If an error is not returned from the key acquisition section, the decryption section 203 decrypts and outputs the ciphertext based on the key. If an error is returned from the key acquisition section, the decryption section 203 returns an error to the user.

As understood from the above description, the hardware of the present invention has a capability of performing encryption-decryption and generation-verification of a MAC with a particular key, and tamper-proofness against hacking operation. The hardware is provided with the following interfaces:

an interface for issuing and registering an ID associated with a key in response to a request from a user;

an interface for decrypting a message with a given ID only when the ID is registered;

an interface for generating a MAC from a decrypted message;

an interface for encrypting a message with a given ID; and an interface for verifying the MAC of a message.

Next, a method for exchanging information in the present invention will be described. An encrypted message is exchanged as described below. First, a message receiver requests an apparatus in which the system 100 of FIG. 1 is incorporated to issue an ID. The system 100 hands over an ID associated with a particular key to the user and registers the ID. The receiver publishes the received ID. A message sender uses the published ID to encrypt a message to be sent, through an apparatus in which a system 100 having the same capabilities is incorporated. Substantially, only the receiver can decrypt the message.

A message with a MAC attached thereto is exchanged as described below. First, a message sender requests an apparatus in which the system 100 is incorporated to issue an ID. The system 100 hands over an ID associated with a particular key to the user and registers the ID. The sender generates a MAC for a message to be sent with the use of the received ID, through the same system 100. Substantially, only the sender can generate the MAC. The sender sends the message, the MAC and the ID. A receiver of the message verifies the received MAC for the received message with the use of the ID through an apparatus in which a system 100 having the same capabilities is incorporated.

A method for further enhancing the security of the present invention is as follows. In order that only a receiver can decrypt a message and only a sender can generate a MAC, it is desirable that the same ID should not be maliciously used, which is a common problem in public key cryptosystem. In order to achieve this, the following methods will be employed.

Key Dilution by Secondary Coding

When an ID is issued, it is encoded with higher entropy by including redundant information therein. Thereby, it is possible to significantly reduce the possibility of the same ID being handed over to users. Furthermore, coding algorithms are varied among apparatus to make inverse encoding difficult. This makes it very difficult for a malicious person to identify a published ID and the ID registered with his own system 100 to be the same. Furthermore, by considering an intentional failure of decryption to be a malicious act and then stopping the functionalities when such an act is detected, it is possible to substantially prevent a malicious person from performing decryption to check the sameness of an ID. For example, this mechanism can be realized by a method of padding a random value. The space for an original ID is defined as X bits, and a Y-bit space is further added in order to dilute a key. In this additional space, a random Y-bit number is put when an original ID is issued. The (X+Y)-bit information obtained in this way is shuffled to obtain an ID to be published. Though this shuffle may be a simple shuffle such as combination of shifts and exchanges, the algorithm is hidden in the tamper-proof system 100. Thereby, the probability of the same keys being issued can be reduced to one $2^Y$-th of the probability in the case of using the X-bit key immediately. The published (X+Y)-bit original key can be also simply implemented by implementing an inverse-operation algorithm in tamper-proof hardware and removing the redundantly added space.

Registration of ID

An issued ID is validated by a certification body. By the certification body guaranteeing the uniqueness of the ID, invalid use of the ID is prevented.

Restriction of Issuance of ID

As means for preventing issuance of the same ID, the number of issuances is limited, or charge for issuance is imposed.

In order to prevent equipment for which an ID has been issued once from being used by other users, user authentication is required to use the equipment.

A method for realizing the present invention in combination with an ID-based cryptosystem will be described. An ID of the present invention functions not as "an ID of an individual" but as "an ID of a key". Therefore, generally, the present invention needs a certification body to publish an ID similarly to other (non-ID-based) public key cryptosystems. Meanwhile, since the object of an ID-based cryptosystem corresponds to the object of the present invention, it is also possible to use both systems in combination with each other. In this case, a key generation body generates a user's private key so that the "ID of an individual" is adapted to be the "ID of a key". This can be achieved, for example, by enabling only the key generation body to issue and register any given ID. In this case, a public key can be known not via the certification body, and therefore, it is possible to construct a system enabling more inexpensive encryption.

EMBODIMENT 1

Figure 3:
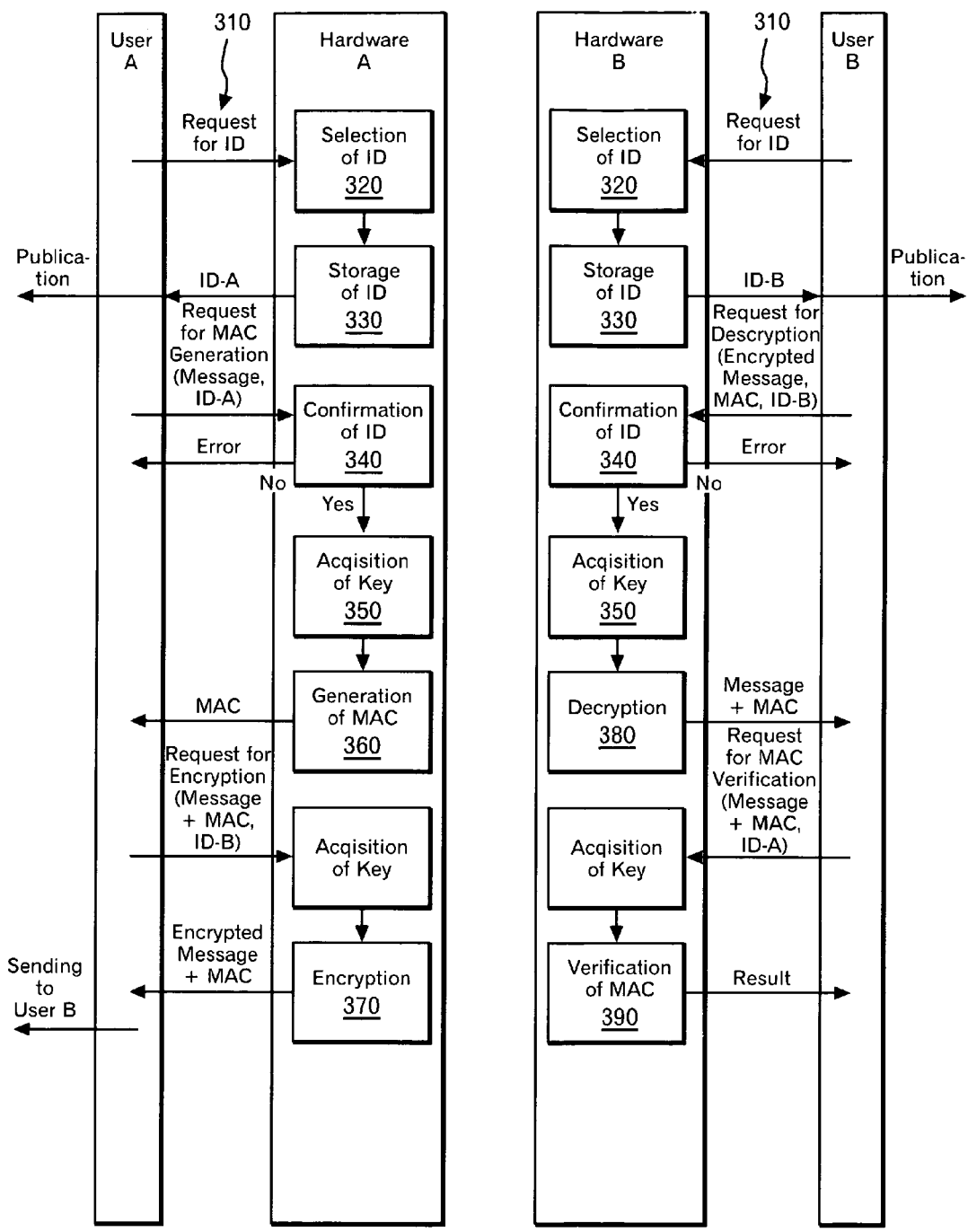
FIG. 3 a diagram illustrating sending-receiving protocols of the present invention.

Description will be made on an embodiment in the case where a sufficient number of keys can be stored in the system 100 (including each interface and sending-receiving protocols) with the use of FIG. 3. It is assumed that a user A and a user B communicate with each other using the system 100 in FIG. 1 (hardware A and hardware B). It is also assumed that a sufficient number of keys are stored in the system 100, each of which is given an ID specific thereto. If the pieces of hardware are the same, mapping of the ID and the key is also the same.

The user A requests an ID from the hardware A (310). The hardware A selects an ID (hereinafter referred to as ID-A) at random from an ID space (320), and returns the ID to the user A. The ID is also stored in an ID storage section. The user A publishes the ID-A. Meanwhile, the user B has also performed the same processing as the user A. That is, the user B requests an ID from the hardware B (310). The hardware B selects an ID (hereinafter referred to as ID-B) at random from an ID space, and returns the ID to the user B. The ID is also stored in an ID storage section (330). The user B publishes the ID-B. Suppose that the user A sends a message to the user B. First, the message is given a MAC with the key of the user A, and then it is encrypted with the key of the user B. Any MAC and any encryption algorithm can be selected without making any change in the configuration of this specification. For example, HMAC-SHA1 or AES may be used.

The user A creates a message to be sent in the following procedure. The user A hands over the message and the ID-A to the hardware A, and requests generation of a MAC. The hardware A checks whether the ID-A is stored in the ID storage section (340). If the ID-A is stored, then the hardware A acquires a key corresponding to the ID-A from the key storage section (350), generates a MAC (360), and returns it to the user A. If the ID-A is not stored, then the hardware A returns an error to the user A. The user A hands over the (message|MAC) and the ID-B to the hardware A and requests encryption. The hardware A acquires a key corresponding to the ID-B from the key storage section, decrypts the (message|MAC) (370), and returns it to the user A.

Meanwhile, the user B processes the received message in the following procedure. The user B hands over the received message and the ID-B to the hardware B and requests decryption. The hardware B checks whether the ID-B is stored in the ID storage section (340). If the ID-B is stored, then the hardware B acquires a key corresponding to the ID-B from the key storage section (350), decrypts the received message (380), and returns it to the user B. If the ID-B is not stored, then the hardware B returns an error to the user B. The user B hands over the message, the MAC and the ID-A to the hardware B, and requests verification of the MAC. The hardware B acquires a key corresponding to the ID-A from the key storage section, verifies the MAC (390), and returns the result to the user B.

EMBODIMENT 2

Figure 4:
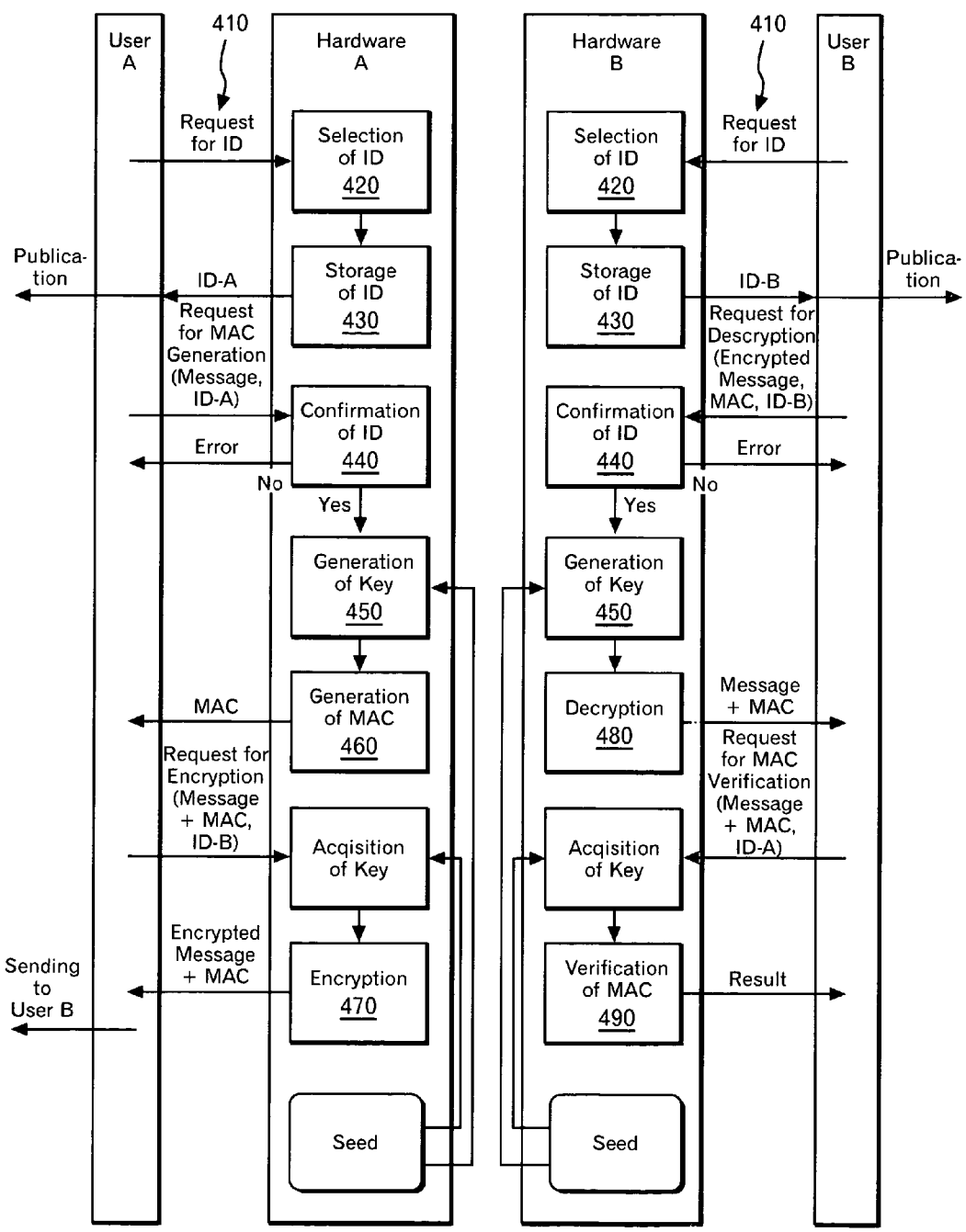
FIG. 4 is a diagram illustrating other sending-receiving protocols of the present invention.

Actually, it is often impossible to a storage capacity enough to store a sufficient number of key. Description will be made on an embodiment in the case where a sufficient number of keys cannot be stored in the system 100 with the use of FIG. 4. Only one value (hereinafter referred to as a seed) is stored in the system 100 so that a key is generated from the seed and an ID as appropriate. Any hash algorithm (for example, SHA-1) is used so that a hash value of (ID|seed) is used as a key. In this case, the procedure for the user A to create a message to be sent is as follows.

The procedure from the step where the users A and B request an ID and the hardware selects and stores an ID to the step where each user publishes his own ID is the same as that of the embodiment described above. Suppose that the user A sends a message to the user B. When creating a message to be sent, the user A hands over the message and the ID-A to the hardware A and requests generation of a MAC. The hardware A checks whether the ID-A is stored in the ID storage section (440). If the ID-A is stored, then the hardware A generates a key from the seed and the ID-A (450), generates a MAC (460), and returns it to the user A. If the ID-A is not stored, then the hardware A returns an error to the user A. The user A hands over (message|MAC) and the ID-B to the hardware A, and requests encryption. The hardware A generates a key from the seed and the ID-B, encrypts the (message|MAC) (470), and returns it to the user A.

On the other hand, the procedure in which the user B processes a received message is as follows. The user B hands over the received message and the IO-B to the hardware B and requests decryption. The hardware B checks whether the IO-B is stored in the 10 storage section (440). If the IO-B is stored, then the hardware B generates a key from the seed and the IO-B (450), decrypts the received message (480), and returns it to the user B. If the IO-B is not stored, then the hardware B returns an error to the user B. The user B hands over the message, the MAC and the IO-A to the hardware B and requests verification of the MAC. The hardware B generates a key from the seed and the IO-A, verifies the MAC (490), and returns the result to the user B.

EMBODIMENT 3

Figure 5:
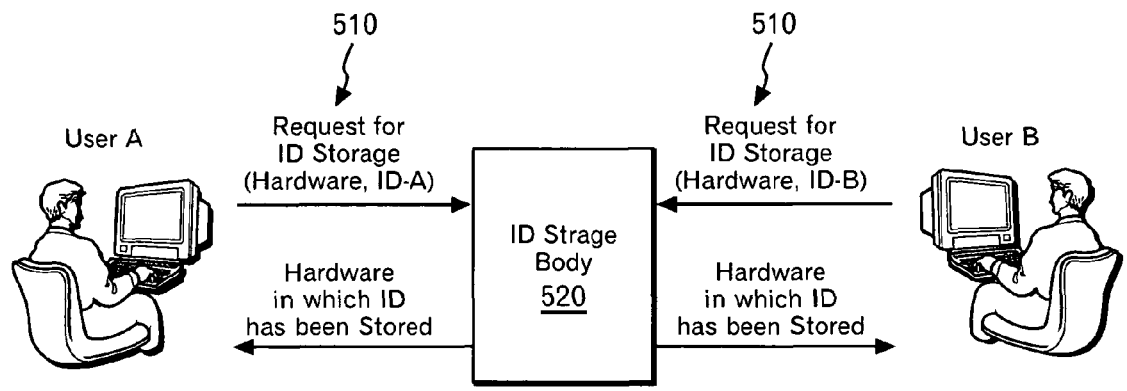
FIG. 5 shows an example of applying the present invention to an ID-based cryptosystem.

In the two embodiments described above, there is shown a case where an ID is selected at random. Next, an example of applying the present invention to an ID-based cryptosystem with the use of FIG. 5. In this case, the processing to be performed by the user A in advance is as follows. The user A hands over the hardware A and the ID-A to an ID storage body 520, and requests storage of the ID in the hardware (510). The ID storage body hands over the ID-A to the hardware A, and requests storage of the ID. The hardware A stores the ID-A in the ID storage section. The processing to be performed by the user B in advance is the same. That is, the user B hands over the hardware B and the ID-B to the ID storage body 520, and requests storage of the ID in the hardware (510). The ID storage body hands over the ID-B to the hardware B, and requests storage of the ID. The hardware B stores the ID-B in the ID storage section. The procedure for the user A to create a message to be sent and the procedure for the user B to process a received message are the same as those in the embodiment 1 or the embodiment 2.

EMBODIMENT 4

Figure 6:
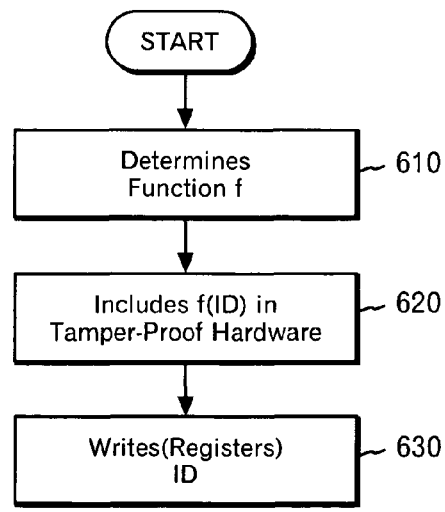
FIG. 6 shows an example of applying the present invention to a mobile phone.

In the embodiment 3, a common procedure in an ID-based cryptosystem has been shown. A procedure enabling acquisition of an ID and handing over of equipment to be performed more efficiently is shown in FIG. 6, taking a case of applying this to a mobile phone as an example. Here, the ID storage mechanism is realized by an equipment manufacturer consigning sale of equipment to a retailer while assuring that an ID is stored in the equipment only once, and the retailer acquiring an appropriate and unique ID by cooperation of the infrastructure, storing it in the equipment and handing over the equipment to a user. Specifically, a phone number is set as an ID. At step 610, the equipment manufacturer determines one one-to-one function f for acquiring a key from the ID (phone number). Next, at step 620, f(ID) is included in a tamper-proof apparatus. The equipment manufacturer prepares a write-once storage in the apparatus in advance. Finally, at step 630, the retailer writes the ID there to register it with the equipment so that it is to be input of f(ID). Here, the same as shown in the embodiment 1 or the embodiment 2, decryption of a message and generation of a MAC with f(ID) is possible only on equipment with which the ID is registered. On the other hand, on equipment with which the ID is not registered, decryption of a message with f(ID) is possible. Verification of a MAC is also possible.

A message is exchanged as follows. The users A and B purchase a mobile phones and obtain unique phone numbers NA and NB, respectively. In the case of encryption, the user A encrypts a message M with f (NB) as a key. The user A sends the encrypted message E(M) to the user B. The user B decrypts the E(M) with the use of f(NB). It is only the user B that can perform decryption with f(NB). In the case of signature, the user A generates a MAC of the message M with f (NA) as a key, and sends the M and the MAC to the user B. In this case, it is only the user A that can generate the MAC of the M with the use of f (NA). The user B can verify the sent message M and MAC and check the signature by the user A. A similar mechanism can be applied to apparatuses other than a mobile phone. For example, when an information appliance is connected to the Internet, an IP address or a host name can be used as an ID.

The present invention can be realized in hardware, software, or a combination of hardware and software. It may be implemented as a method having steps to implement one or more functions of the invention, and/or it may be implemented as an apparatus having components and/or means to implement one or more steps of a method of the invention described above and/or known to those skilled in the art. A visualization tool according to the present invention can be realized in a centralized fashion in one computer system or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Methods of this invention may be implemented by an apparatus which provides the functions carrying out the steps of the methods. Apparatus and/or systems of this invention may be implemented by a method that includes steps to produce the functions of the apparatus and/or systems.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing one or more functions described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for performing key encryption with the use of an apparatus including an encryption-authentication section, comprising:

issuing a first ID in response to a request by a user, and storing the first ID in a storage section;

generating a key corresponding to the first ID and outputting the key;

in response to a request by a user for decryption or generation of a message authentication code, comparing an inputted second ID and the first ID;

handing over the first ID to the key generation section to output a key generated by the key generation section if the first ID and the second ID correspond to each other, and outputting an error message if the first ID and the second ID do not correspond to each other;

in response to a request by a user for encryption or verification of a message with a message authentication code attached thereto, handing over the inputted second ID to the key generation section to output the key generated by the key generation section;

handing over the inputted second ID to the first key acquisition section;

with the use of a key outputted from the first key acquisition section, calculating and outputting a message authentication code of an inputted message;

handing over the inputted second ID to the second key acquisition section, calculating the message authentication code of the inputted message with the use of a key outputted from the second key acquisition section, and comparing an obtained message authentication code and an inputted message authentication code;

outputting a success message if the obtained message authentication code is the same as the inputted message authentication code;

outputting a failure message if the obtained message authentication code is not the same as the inputted message authentication code;

handing over the inputted second ID to the second key acquisition section, encrypting inputted text with the use of the key outputted from the second key acquisition section, and returning the result to the user; and handing over the inputted second ID to the first acquisition section and, with the use of the key outputted from the first key acquisition section, decrypting and outputting inputted encrypted text.

2. An apparatus including an encryption-authentication section implemented using a general purpose computer system with a computer program that, when being loaded and executed, controls the computer system, the apparatus comprising:

an ID issuance-registration section configured to issue a first ID in response to a request by a user, and to store the first ID in a storage section;

a key generation section configured to generate a key corresponding to the first ID and to output the key;

a first key acquisition section configured to compare an inputted second ID and the first ID in response to a request by a user for decryption or generation of a message authentication code, configured to hand over the first ID to the key generation section to output a key generated by the key generation section if the first ID and the second ID correspond to each other, and configured to output an error message if the first ID and the second ID do not correspond to each other;

a second key acquisition section configured to hand over the inputted second ID to the key generation section to output the key generated by the key generation section, in response to a request by a user for encryption or verification of a message with a message authentication code attached thereto;

a message authentication code generation section configured to hand over the inputted second ID to the first key acquisition section, and, with the use of a key outputted from the first key acquisition section, to calculate and output a message authentication code of an inputted message;

a message authentication code verification section configured to hand over the inputted second ID to the second key acquisition section, to calculate the message authentication code of the inputted message with the use of a key outputted from the second key acquisition section, and configured to compare an obtained message authentication code and an inputted message authentication code, wherein the message authentication code verification section is configured to output a success message if the obtained message authentication code is the same as the inputted message authentication code and output a failure message if the obtained message authentication code is not the same as the inputted message authentication code;

an encryption section configured to hand over the inputted second ID to the second key acquisition section, to encrypt inputted text with the use of the key outputted from the second key acquisition section, and to return the result to the user; and a decryption section configured to hand over the inputted second ID to the first acquisition section and, with the use of the key outputted from the first key acquisition section, to decrypt and output inputted encrypted text.

* * * * *